United States Patent [19]

Selbeck et al.

[11] 4,180,493

[45] Dec. 25, 1979

[54] COATING COMPOSITIONS FOR POLYCARBONATES

[75] Inventors: Harald Selbeck; Rolf Dhein, both of Krefeld; Wolfgang Cohnen, Leverkusen, all of Fed. Rep. of Germany

[73] Assignee: Bayer Aktiengesellschaft, Fed. Rep. of Germany

[21] Appl. No.: 896,172

[22] Filed: Apr. 14, 1978

[30] Foreign Application Priority Data

Apr. 19, 1977 [DE] Fed. Rep. of Germany ....... 2717164

[51] Int. Cl.² ............................ C08K 5/05; C08K 5/07; C08L 61/28; C08L 61/32
[52] U.S. Cl. .......................... 260/32.8 N; 260/33.4 R; 428/412; 525/174
[58] Field of Search ................. 260/855, 856, 33.4 R, 260/32.8 N; 428/500, 412

[56] References Cited

U.S. PATENT DOCUMENTS

| 3,222,418 | 12/1965 | Murdock | 260/855 |
| 3,365,414 | 1/1968 | Fisk et al. | 260/855 |
| 3,451,955 | 6/1969 | Koral et al. | 260/855 |
| 3,674,734 | 7/1972 | Parker | 260/855 |
| 3,843,390 | 10/1974 | Hudson et al. | 260/856 |
| 3,846,368 | 11/1974 | Pettit, Jr. | 260/856 |
| 3,862,071 | 1/1975 | DiCarlo | 260/856 |

Primary Examiner—Allan Lieberman
Attorney, Agent, or Firm—Connolly and Hutz

[57] ABSTRACT

A coating composition for polycarbonate surfaces comprising a mixture of:

(A) 86% to 98% by weight of hydroxyl-group-containing copolymers with copolymerized units of:
  (a) 20% to 32% by weight of at least one aromatic vinyl monomer,
  (b) 8% to 18% by weight of at least one hydroxylalkyl ester of acrylic or methacrylic acid containing from 2 to 12 carbon atoms in the alkyl group, and
  (c) 50% to 70% by weight of at least one acrylic or methacrylic acid ester containing from 1 to 8 carbon atoms in the saturated aliphatic monoalcohol component and/or a mixture thereof; and (B) 2 to 14% by weight of at least one melamine resin.

4 Claims, No Drawings

COATING COMPOSITIONS FOR POLYCARBONATES

This invention relates to coating compositions for polycarbonate surfaces based on copolymers of acrylates containing hydroxyl groups, aromatic vinyl monomers and, optionally, etherified melamine-aldehyde resins.

Mouldings produced from polycarbonates are widely used in technology because they show excellent breakage resistance, high thermal stability and low weight. Unfortunately, one disadvantage of such mouldings is their moderate weathering resistance. Accordingly, it is advisable for external applications to provide the surfaces of the polycarbonate moulding with a weather-resistant lacquer coating. Lacquer coatings for polycarbonates are already known from the literature.

Coating lacquers which have been used for this purpose include, for example, polymethyl methacrylate (cf. German Auslegeschrift No. 1,694,273), methyl methacrylate/ethyl acrylate copolymers (cf. U.S. Pat. No. 3,594,264), thermosetting acrylates consisting of acrylic copolymers, polyester diols and melamine resins (cf. German Offenlegungsschrift No. 2,317,874), polyester resins (cf. U.S. Pat. No. 3,309,222), urethane prepolymers in combination with melamine resins (cf. German Offenlegungsschrift No. 2,211,915), barium titanate (cf. U.S. Pat. No. 3,652,328) and silicone resins (cf. German Auslegeschrift No. 1,962,354).

Although these lacquer systems are not entirely unsuitable for lacquering polycarbonate mouldings, they are unable to satisfy more stringent requirements. Particularly stringent requirements exist when the lacquer coating is required to be transparent, to show high gloss, high permeability to light, strong adhesion, high weathering resistance, high resistance to solvents and adequate scratch resistance, and not to affect the mechanical properties of the polycarbonate, i.e. in particular not to give rise to stressing and crack formation in the polycarbonate mouldings.

Although the lacquer coatings known from the literature are satisfactory in certain respects, they do not satisfy all the above-mentioned requirements, particularly because they are frequently brittle, show poor adhesion and inadequate weather resistance or, as in the case of polymethyl methacrylate, they are weather-resistant but show inadequate scratch resistance and poor resistance to solvents.

The combination of polyacrylates containing hydroxyl and carboxyl groups and melamine-aldehyde resins gives totally unsuitable lacquer coatings on polycarbonates. It is only the additional use of polyester diols as further crosslinking components which gives improved polycarbonate coatings (cf. German Offenlegungsschrift No. 2,317,874). However, the presence of polyester diols gives rise to the serious disadvantage that polycarbonate lacquer coatings of this type show very little resistance to weather due to the fact that they can be hydrolysed relatively easily.

It has now surprisingly been found that acrylates containing functional groups in combination with melamine resins represent high-quality polycarbonate coating compositions without the need for any other cross-linking constituents to be present in the coating mixture. The polycarbonate coatings produced with the lacquer coating compositions according to the invention are superior in all their properties relative to the lacquer coatings known from the literature and, in particular, they show high gloss, high permeability to light, good adhesion, resistance to weather, scratch resistance and adequate resistance to solvents.

The thermosetting acrylates present in the coating system according to the invention consist of copolymerised units of hydroxyalkyl esters of acrylic or methacrylic acid, alkyl esters of acrylic or methacrylic acid and aromatic vinyl monomers.

Although the copolymers used are known per se in this form or a similar form, their excellent suitability as coating compositions for polycarbonate surfaces has hitherto never been recognised.

Compositions distinguished by a relatively high molecular weight for low OH-numbers are particularly advantageous. Any deviations from the composition used in the coating system according to the invention give rise to lacquer coatings which show distinct disadvantages, particularly in adhesion and resistance to weather in relation to the lacquer coatings according to the invention.

The present invention relates to coating compositions for polycarbonate surfaces of polyacrylates containing functional groups and melamine resins, distinguished by the fact that the coating compositions consist of mixtures of from:

(A) 86 to 98% by weight of hydroxyl-group-containing copolymers with copolymerised units of:
 (a) 20 to 32% by weight of at least one aromatic vinyl monomer,
 (b) 8 to 18% by weight of at least one hydroxyalkyl ester of acrylic or methacrylic acid containing from 2 to 12 carbon atoms in the alkyl group and
 (c) 50 to 70% by weight of at least one acrylic or methacrylic acid ester containing from 1 to 8 carbon atoms in the saturated monoalcohol component; and (B) 2 to 14% by weight of melamine resins. Particularly preferred coating compositions consist of mixtures of copolymers containing copolymerised units of (A)
 (a) 20 to 32% by weight of styrene;
 (b) 10 to 15% by weight of hydroxypropyl methacrylate;
 (c) 25 to 35% by weight of methyl methacrylate; and
 (d) 27 to 37% by weight of butyl acrylate; and (B) 4 to 8% by weight of hexamethoxymethyl melamine. These preferred components show optimum properties in regard to adhesion and weather resistance.

The OH-numbers of the copolymers should amount to between 30 and 80 and preferably to between 40 and 60. Their molecular weights (weight averages $\overline{M}_w$), determined through the intrinsic viscosity value on the basis of standard curves of the copolymers amount to between 10,000 and 60,000 and preferably to between about 20,000 and 40,000.

The aromatic vinyl monomers used are styrene, vinyl toluene and divinyl benzene, particularly styrene. The hydroxyalkyl esters of acrylic or methacrylic acid which may contain up to 12 carbon atoms in the alkyl radical are obtained from acrylic acid or methacrylic acid by esterification with ethylene glycol, 1,2-propane diol, 1,3-propane diol, 1,2-butane diol, 1,4-butane diol and 1,10-dodecane diol. It is preferred to use hydroxyethyl acrylate, hydroxypropyl acrylate, hydroxyethyl methacrylate and hydroxypropyl methacrylate.

The acrylic or methacrylic acid esters of aliphatic $C_1$–$C_8$ monoalcohols used in accordance with the present invention are methyl acrylate, ethyl acrylate, butyl acrylate, 2-ethylhexyl acrylate, methyl methacrylate, butyl methacrylate and 2-ethyl hexyl methacrylate.

Melamine resins suitable for crosslinking with the OH-containing copolymers are any of the usual melamine resins optionally etherified with saturated $C_1$–$C_4$ monoalcohols, of the type described for example in D. H. Solomon "The Chemistry of Organic Filmformers", pp. 235–240, John Wiley & Sons, Inc., New York, 1967. However, the melamine resins may also either be completely or partly replaced by other crosslinking aminoplasts, of the type described for example in "Methoden der Organischen Chemie" (Houben-Weyl), Vol. 14/2, part 2, 4th Edition, Georg Thieme Verlag, Stuttgart 1963, pages 319 et seq, or by phenoplasts of the type described for example on pages 193 et seq of the same literature reference. Hexamethoxymethyl melamine has proved to be particularly suitable.

It is known that polycarbonates are not resistant to all solvents. They are largely resistant to alcohols, but are highly vulnerable to a greater or lesser extent to aromatic hydrocarbons, esters and ketones. The effect of the last of these solvents can result in serious deterioration in the mechanical properties of the polycarbonates. In particular, stresses and cracks can be formed in the polycarbonate. Accordingly, it is obvious that the coating compositions according to the present invention should only be used in solution in solvents which have the least possible effect upon polycarbonate. In order to obtain better adhesion of the lacquer coating to the surface of the polycarbonate moulding, it is best to use small quantities of solvents which only incipiently soften or dissolve the polycarbonate surface. One solvent mixture which may be used for applying the coating composition according to the invention mainly contains for example n-butanol, isobutanol, tert.-butanol, ethylene glycol or diacetone alcohol in combination with small quantities of solvents which incipiently dissolve the polycarbonate surface, for example toluene, xylene or methylethyl ketone. Instead of using the above-mentioned solvents, it is also possible to use other solvents of the type normally encountered in the lacquer field. In preparing the solvent mixtures, the only important requirement to be borne in mind is that the components dissolving the polycarbonate should represent a low percentage of the mixture. Other solvents which may be used include ethanol, n-propanol, 1,2-propane diol, 2-ethyl hexanol, ethyl acetate, butyl acetate, isopropyl acetate, isobutyl acetate, ethyl glycol acetate, butyl glycol acetate, acetone, diethyl ketone, cyclohexanone, cyclopentanone, pentane, hexane, heptane, octance, cyclohexane, chlorobenzene, o-dichlorobenzene and dioxane.

The copolymers are produced by the known methods of solution, bulk and dispersion polymerisation. The polymerisation reaction is preferably carried out in solution, best in a solvent which is at least partly present in the final lacquer solution.

Suitable polymerisation initiators are, for example, diacyl peroxides, such as diacetyl peroxide, dibenzoyl peroxide, di-p-chlorobenzoyl peroxide, dilauryl peroxide, peroxy esters such as tert.-butyl peroxy acetate, tert.-butyl peroxy benzoate, dicyclohexyl peroxy dicarbonate, alkyl peroxides such as bis(tert.-butylperoxybutane), dicumyl peroxide, tert.-butylcumyl peroxide, hydroperoxides such as cumene hydroperoxide, tert.-butyl hydroperoxide, cyclohexanone hydroperoxide, acetyl acetone peroxide, benzoin aryl and silylether compounds or azodiisobutyronitrile in quantities of from 0.3 to 6% by weight, based on the monomer. It is also possible to use molecular weight regulators which have proved successful in practice, such as n-dodecyl mercaptan.

Polymerisation methods such as these are described, for example, in the book entitled "Methoden der Organischen Chemie", Houben-Weyl, 4th Edition, Vol. 14/1, pages 24–556 (1961).

The lacquer used for lacquering the polycarbonate best contains a compound which absorbs UV-light through which the lacquered polycarbonate mouldings are made more resistant to UV-irradiation. Suitable UV-absorbers are the compounds known from practice, for example of the 2-hydroxybenzophenone series, for example 2-hydroxy-4-n-octoxy benzophenone. The quantities in which the UV-absorbers are added amount to between 0.1 and 20%, based on the weight of the lacquer solution.

The stoving lacquer systems according to the invention are generally applied by the usual methods, such as dip coating, spray-coating and casting, and the like in layer thicknesses of from 0.1 to 50μ. They are hardened by stoving at temperatures of from 60° to 135° C.

The hardening process may be accelerated by using the acid catalysts normally encountered in the lacquer field, such as p-toluene sulphonic acid, for example, in the usual concentrations.

Nail-hard, glossy lacquer coatings are obtained. They show good adhesion and gloss retention, even after weathering in a Weather-O-Meter.

Gloss was assessed in accordance with ASTM D 523 at a reflection angle of 20° in a Gardner gloss meter. The higher the value quoted, the better the gloss.

In the testing of adhesion by the lattice cut method, cuts are made in the lacquer coating at intervals of 1 mm using a sharp knife. A self-adhesive tape is pressed onto the square-lattice structure formed, torn off and the percentage detachment of the squares determined. The assessment scale ranges from 0 (complete detachment) to 100 (no detachment).

The mechanical properties of the polycarbonate before and after lacquering were tested on the basis of the penetration resistance of polycarbonate panels. The penetration work was determined in accordance with DIN No. 53 443, according to which a 1 cm. diameter spike penetrates through the polycarbonate panel under the impact of a 35 kg. weight dropped from a height of 1 meter, and the work required to obtain penetration is determined in Joules.

The parts quoted in the following Examples represent parts by weight and the percentages percent by weight.

EXAMPLE 1

250 parts of diacetone alcohol were introduced into a stirrer-equipped apparatus provided with a reflux condenser, thermometer, dropping funnel and nitrogen inlet pipe, a gentle stream of nitrogen was passed over, the internal temperature was increased to approximately 110° C. and a mixture of 67.5 parts of styrene, 80 parts of methyl methacrylate, 30 parts of hydroxypropyl methacrylate, 72.5 parts of butyl acrylate, 1.5 parts of tert.-butyl peroctoate and 1.3 parts of n-dodecyl mercaptan was added dropwise over a period of 3 to 4 hours. After another 2 hours at 110° C., 0.2 part of tert.-butyl peroctoate was added 5 times every 2 hours. The mixture was then after-polymerised for 3 hours at 110° C. The solution had a solids content of 49.8% and a viscosity of 440 cP, as measured at 20° C. in a Hoeppler viscosimeter. The polymer had an OH number of 46. Its molecular weight (weight average $\overline{M}_w$) amounted to approximately 27,000, as determined from the intrinsic viscosity value.

67 parts of isobutanol, 69 parts of diacetone alcohol, 39 parts of methylethyl ketone, 12 parts of 2-hydroxy-4-n-octoxybenzophenone, 4.2 parts of hexamethoxymethyl melamine and 0.5 part of p-toluene sulphonic acid were added to 100 parts of the copolymer solution. Polycarbonate mouldings are coated with the lacquer solution according to the invention in a dry film layer thickness of 15 μm. The stoving time was 30 minutes at 125°–130° C. Nail-hard lacquer coatings with the following properties were obtained:

| | |
|---|---|
| Adhesion by the lattice cut method: | 100 |
| Adhesion by the lattice cut method (after 1000 h in a Sunshine-Weather-O-Meter): | 100 |
| Gloss (according to ASTM D 523): | 148 |
| Gloss according to ASTM D 523 (after 1000 h in a Sunshine-Weather-O-Meter): | 146 |
| Penetration work (smooth penetration): | 38.1 J |
| For comparison: | |
| Uncoated polycarbonate (smooth penetration): | 34.9 J |

We claim:

1. A coating composition for polycarbonate surfaces comprising a solvent having little effect on polycarbonate and dissolved therein a mixture of:
   (A) 86% to 98% by weight of copolymer having a hydroxyl number of from 30 to 80 and a weight average molecular weight of from 10,000 to 60,000 comprising copolymerized units of:
      (a) 20% to 32% by weight of at least one aromatic vinyl monomer,
      (b) 8% to 18% by weight of at least one hydroxyalkyl ester of acrylic or methacrylic acid containing from 2 to 12 carbon atoms in the alkyl group, and
      (c) 50 to 70% by weight of at least one acrylic or methacrylic acid ester of a saturated aliphatic monoalcohol having 1 to 8 carbon atoms; and
   (B) 2 to 14% by weight of at least one melamine resin.

2. A coating composition as claimed in claim 1, wherein the mixture comprises copolymerised units of:
   (A)
      (a) 20 to 32% by weight of styrene,
      (b) 10 to 15% by weight of hydroxypropyl methacrylate,
      (c) 25 to 35% by weight of methyl acrylate,
      (d) 27 to 37% by weight of butyl acrylate; and
   (B) 4 to 8% by weight of hexamethoxymethyl melamine.

3. A coating composition as claimed in claim 1, wherein the composition includes a compound which absorbs UV-light.

4. The composition according to claim 2 wherein said solvent is butanol, ethylene glycol or diacetone alcohol in combination with a small amount of a different solvent which incipiently dissolves a polycarbonate surface.

* * * * *